United States Patent
Lee et al.

(10) Patent No.: US 6,369,643 B1
(45) Date of Patent: Apr. 9, 2002

(54) APPARATUS AND METHOD FOR CONTROLLING POWER SAVING MODE IN A POWER SUPPLY

(75) Inventors: Dong Ju Lee, Pyungtaek; Dae Beum Pyeon, Suwon, both of (KR)

(73) Assignee: LG Electronics Inc., Seoul (KR)

(*) Notice: Subject to any disclaimer, the term of this patent is extended or adjusted under 35 U.S.C. 154(b) by 0 days.

(21) Appl. No.: 09/422,730

(22) Filed: Oct. 22, 1999

(30) Foreign Application Priority Data

Oct. 22, 1998 (KR) .......................................... 98/44768

(51) Int. Cl.[7] .............................................. G05F 1/10
(52) U.S. Cl. .......................... 327/544; 363/95; 327/143
(58) Field of Search ........................ 327/541, 99, 544, 327/143, 144; 455/343; 395/750; 363/89, 95

(56) References Cited

U.S. PATENT DOCUMENTS

| | | | | |
|---|---|---|---|---|
| 4,686,386 A | * | 8/1987 | Tadao | 327/544 |
| 5,349,562 A | * | 9/1994 | Tanizaki | 365/222 |
| 5,475,847 A | * | 12/1995 | Ikeda | 395/750 |
| 6,009,005 A | * | 12/1999 | Kim | 363/95 |
| 6,020,781 A | * | 2/2000 | Fujioka | 327/541 |
| 6,029,061 A | * | 2/2000 | Kohlschmidt | 455/343 |

* cited by examiner

*Primary Examiner*—Dinh T. Le
(74) *Attorney, Agent, or Firm*—Birch, Stewart, Kolasch & Birch, LLP

(57) ABSTRACT

The apparatus for controlling a power supply, which supplies power to loads, includes a low frequency clock generator generating a low frequency clock, a high frequency clock generator generating a high frequency clock, and a controller. The controller controls operation of the power supply. While operating at the low frequency clock in a first mode, if the controller receives an input signal, the controller determines if the input signal includes a predetermined portion. The controller then switches to operation at the high frequency clock in a second mode if the input signal is determined to include the predetermined portion.

15 Claims, 7 Drawing Sheets

APPARATUS AND METHOD FOR CONTROLLING POWER SAVING MODE IN A POWER SUPPLY

BACKGROUND OF THE INVENTION

1. Field of the Invention

The present invention relates to an apparatus and method for controlling a power saving mode of a power supply.

2. Description of the Conventional Art

A conventional apparatus for controlling a power saving mode of a power supply is automatically switched to a power saving mode to minimize the power consumption of a power supply when a power saving mode key input signal is externally applied or a predetermined time has elapsed since alternating current(AC) power was supplied but the loads do not consume the AC power. Also, when the power supply is in the power saving mode, a backup capacitor of a backup unit provides power to a key input signal input unit and a microcomputer of the power saving mode controlling apparatus to detect the power supply operation key input signal.

Figure 1:
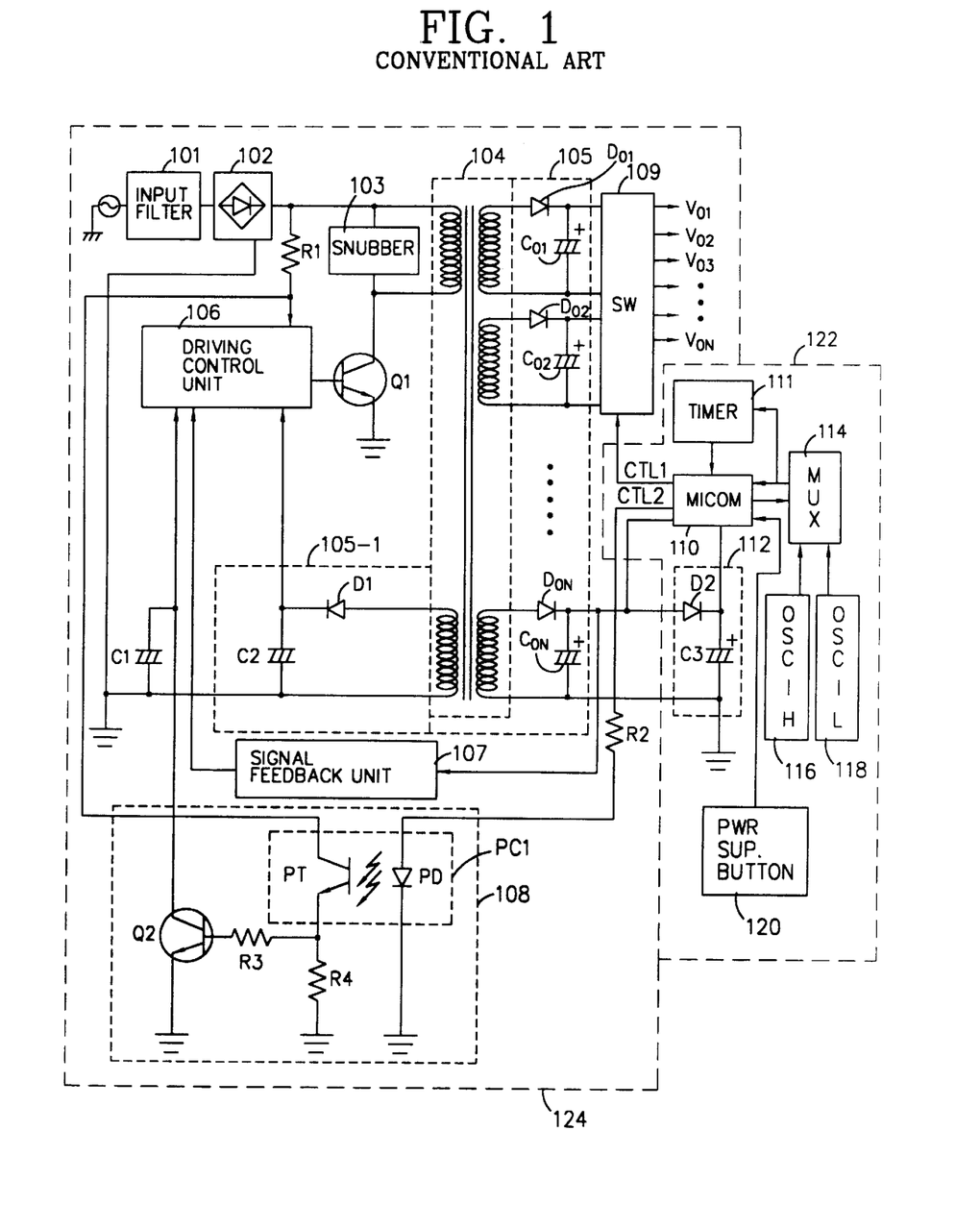
FIG. 1 is a schematic block diagram illustrating a conventional switched mode power supply (SMPS)

FIG. 1 is a schematic block diagram illustrating a conventional switching mode power supply (SMPS) developed by the inventors of the subject application and disclosed in application Ser. No. 09/373,075, filed Aug. 11, 1999; and hereby incorporated by reference in its entirety. As shown, the SMPS includes a power supply circuit unit 124 and a controlling unit 122.

As shown therein, the power supply circuit unit 124 includes an input filter unit 101 receiving AC power from an AC power source and reducing noise included in the AC power; a rectifying and smoothing unit 102 rectifying and smoothing the noise free AC power; a switching device Q1 receiving a predetermined control signal from first and second signal feedback units 107 and 108 and switching on/off a transformer 104, which is to be later described; a snubber 103 eliminating switching noises which are generated in accordance with the switching on/off operation of the switching device Q1; a transformer 104 receiving DC (direct current) power outputted from the rectifying and smoothing unit 102 and transforming energy from a primary terminal to secondary terminals of the transformer 104 in accordance with an on/off operation of the switching device Q1, for thereby inducing a plurality of AC voltages; a first rectifying and smoothing unit 105 inputting the AC voltages which are induced at the secondary terminals of the transformer 104, rectifying and smoothing the AC voltages and outputting a plurality of DC voltages; a switching unit 109 receiving the DC voltages and outputting DC voltages Vo1, Vo2, ..., VoN to loads (not shown) in accordance with the control of a microcomputer 110; a second rectifying and smoothing unit 105-1 inputting AC power, which was generated from an auxiliary terminal of the transformer 104, and outputting a DC voltage; and a driving control unit 106 receiving the DC voltage outputted from the second rectifying and smoothing unit 105-1 and control signals outputted from a control unit, which will be later described, and controlling the switching on/off operation of the switching device Q1.

Further, the control unit 122 of the conventional SMPS includes a microcomputer 110 controlling the system based in part on receiving key input signals such as from a power supply button 120; a timer 111 generating and outputting a timing signal to the microcomputer 110; a multiplexer 114 supplying either a high or low frequency signal from respective high and low frequency oscillators 116 and 118 to the microcomputer 110 and the timer 111; a backup unit 112 charged by receiving one of the DC voltages outputted from the rectifying and smoothing unit 105 and supplying power to the microcomputer 110 in the power saving mode; the first signal feedback unit 107 providing DC power to the driving control unit 106; and the second signal feedback unit 108 controlling an operation of the driving control unit 106 in accordance with a control signal outputted from the microcomputer 110 in the power saving mode. Wherein the first and second signal feedback units 107 and 108, respectively, are constituted of a photocoupler PC1, a switching device Q2 (e.g., a transistor), and resistors R3, R4.

The operation of the conventional SMPS will be described in detail with the accompanying drawings.

When it is in a normal mode, where the loads consume power and AC power is inputted to the input filter unit 101 from AC source power, the input filter unit 101 eliminates the noises included in the AC power and outputs the noise free AC power to the rectifying and smoothing unit 102. Then, the rectifying and smoothing unit 102 rectifies and smoothes the noise free AC power supply and outputs a DC voltage having a predetermined level to a primary terminal of the transformer 104 and the driving control unit 106.

Here, as the driving control unit 106 switches the switching device Q1 on and off, a plurality of AC voltages are induced to the secondary terminals of the transformer 104. Then the rectifying and smoothing unit 105 receives, rectifies and smoothes the induced AC voltages; thereby outputting DC voltages to the switching unit 109, which outputs the DC voltages Vo1, Vo2, ..., VoN to the loads (not shown).

In the above-described normal mode, the microcomputer 110, which receives one of the DC voltages outputted from the rectifying and smoothing unit 105, controls the switching unit 109 so that it provides matching power to the loads. During the normal mode, the microcomputer 110 instructs the multiplexer 114 to output the high frequency signal so that the microcomputer 110 operates at the high frequency clock from the timer 111. Also, the backup unit 112 receives the DC power and charges a backup capacitor C3, for providing the charged power to the microcomputer 110 in the power saving mode.

When the power supply is in the normal mode, in which the loads consume the power, and a user inputs a power saving mode key input signal or a predetermined period of no power consumption has elapsed, the microcomputer 110 outputs a control signal having a predetermined duty to a photodiode PD of the photocoupler PC1 in the second signal feedback unit 108 through a resistor R2. When the photodiode PD and a phototransistor PT in the photocoupler PC1 are operated, the switching device Q2 outputs a control signal to the driving control unit 106, and, accordingly, the driving control unit 106 is controlled. Here, when the second signal feedback unit 108 is switched on, the driving control unit 106 receives a ground level signal, thereby stopping the switching operation of the switching device Q1 and stopping the operation of the transformer 104. Accordingly, the SMPS enters into a power saving mode.

When the transformer 104 is stopped and no voltages are induced in the secondary terminals of the transformer 104, that is when the SMPS is in the power saving mode, the backup unit 112 supplies a backup power to the microcomputer 110. Also, the microcomputer 110 causes the multiplexer 114 to output the low frequency signal so that the microcomputer 110 operates at a low frequency clock signal such as 32 kHz during the time when the transformer 104 does not operate.

When the power supply is in the power saving mode under the above-mentioned conditions, if a power supply operation key input signal is inputted to the power supply via the power supply button 120, the power supply immediately supplies the power to the loads.

Figure 2A:
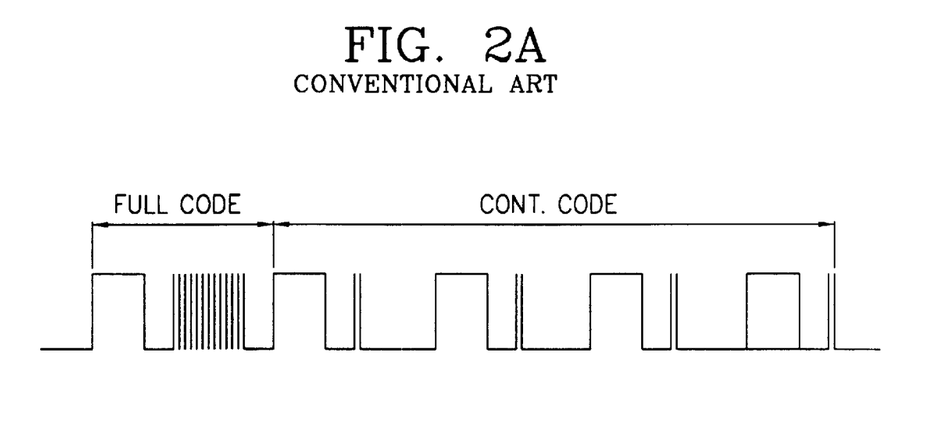
FIGS. 2A and 2B are diagrams illustrating a conventional remote controller (R/C) key input signal.
Figure 2B:
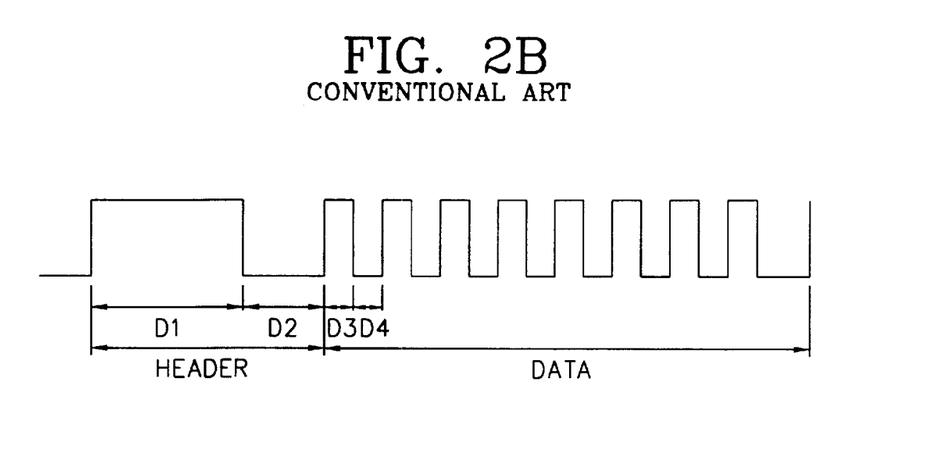

FIG. 2A illustrates a remote controller (R/C) key input signal supplied to the conventional SMPS. The R/C key input signal includes a full code and a continuous code. The full code consists of a header and data, and the consecutive code indicates that a remote controller key is continuously pressed. FIG. 2B illustrates the full code of FIG. 2A in detail, wherein a header or enable part is a low frequency signal having a high level D1 and a low level D2 for a duration of 9.5 ms and 4.5 ms respectively, and a data or SMPS on part is a high frequency signal having a high level D3 and a low level D4 for a duration of 0.56 ms.

To detect the high frequency portion of the R/C key input signal, the microcomputer 110 must be driven at the high frequency clock (14 MHz), which consumes a considerable amount of power. When the microcomputer 110 is driven at the low frequency clock signal (32 KHz), the microcomputer 110 can not detect the R/C key input signal. Accordingly, the user has to manually press a power saving mode canceling key or power supply button 120 so that the SMPS provides power to the loads and the microcomputer 110 can detect R/C key input signals.

SUMMARY OF THE INVENTION

Accordingly, the present invention is directed to an apparatus for controlling a power saving mode in a power supply and a method thereof which obviate the problems and disadvantages in the conventional art.

An object of the present invention is to provide a method and apparatus for controlling a power saving mode in a power supply which converts a power saving mode of the power supply into a normal mode by a remote controller key input signal.

Another object of the present invention is to provide a method and apparatus for controlling a power saving mode in a power supply which detect a low frequency remote controller key input signal, cancel a power saving mode of the power supply and provides power to the loads.

Another object of the present invention is to provide a method and apparatus for controlling a power saving mode in a power supply which minimize power consumption during a power saving mode of the power supply, detect a low frequency remote controller key input signal, cancel a power saving mode of the power supply and provides power to the loads.

Another object of the present invention is to provide a method and apparatus for controlling a power saving mode in a power supply which minimize power consumption during a power saving mode of the power supply, detect a low frequency remote controller key input signal and operates a microcomputer with a high frequency clock signal.

These and other objects are achieved by providing an apparatus for controlling a power supply, which supplies power to loads, comprising: a low frequency clock generator generating a low frequency clock; a high frequency clock generator generating a high frequency clock; and a controller controlling operation of said power supply, operating at said low frequency clock in a first mode, receiving an input signal while in said first mode, determining if said input signal includes a predetermined portion while in said first mode, and switching to operation at said high frequency clock in a second mode if said input signal is determined to include said predetermined portion.

These and other objects are further achieved by providing a method for controlling a power supply, which supplies power to loads, comprising: operating a controller, which controls operation of said power supply, at a low frequency clock in a first mode; receiving an input signal while said controller operates in said first mode; determining if said input signal includes a predetermined portion while in said first mode; and switching operation of said controller to operation at a high frequency clock in a second mode if said input signal is determined to include said predetermined portion.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIGS. 4A–4C are diagrams illustrating an R/C key input signal according to an embodiment of the present invention;

FIGS. 6A–6C are diagrams illustrating an R/C key input signal according to another embodiment of the present invention.

DETAILED DESCRIPTION OF THE INVENTION

Reference will now be made in detail to the preferred embodiments of the present invention, examples of which are illustrated in the accompanying drawings.

Figure 3:
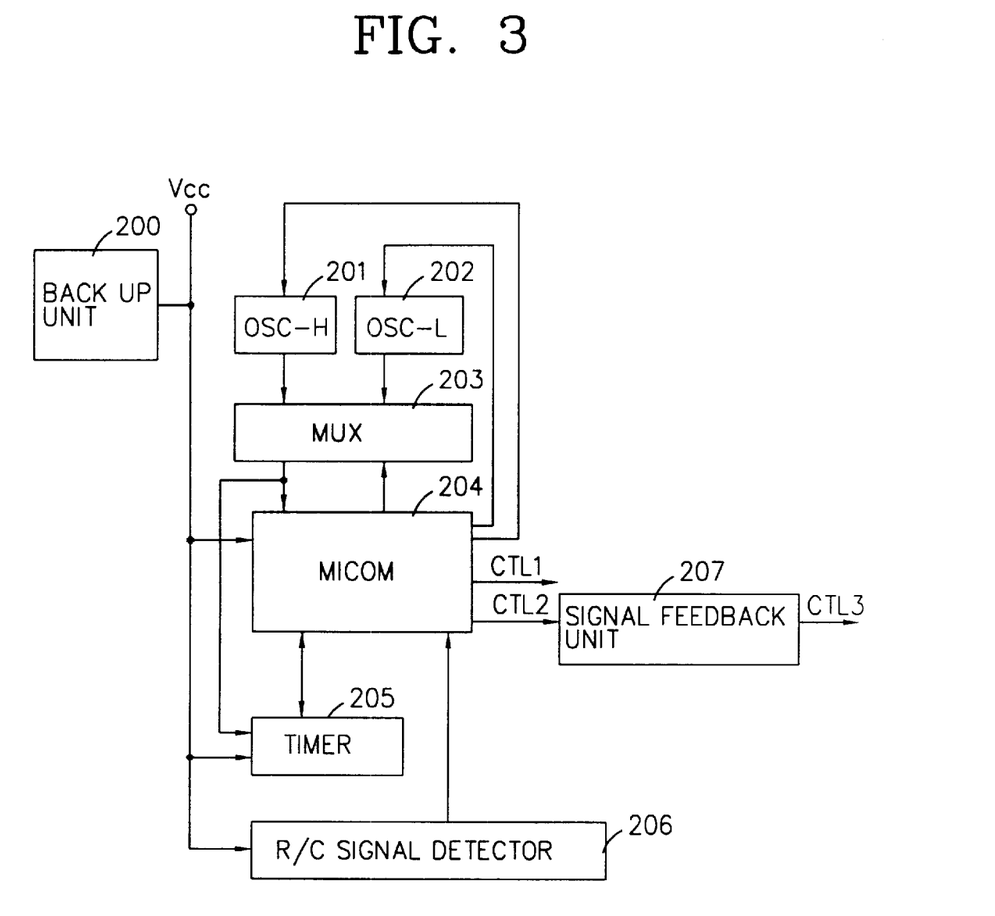
FIG. 3 is a schematic diagram illustrating a power saving mode controlling apparatus according to a first embodiment of the present invention.

The switching mode power supply according to the present invention is the same as the conventional art except for the control unit 122 has been replaced with the control unit shown schematically in FIG. 3.

As shown therein, the control unit according to the present invention includes a backup unit 200 being charged in a normal mode and providing charged power to each circuit block in a power saving mode; a microcomputer 204 outputting in the normal mode a control signal CTL1, which controls the switch unit 109, and in a power saving mode receiving DC power from the backup unit 200 and outputting a control signal CTL2 to a first signal feedback unit 207, which is to be later described; a high frequency clock signal oscillator OSC-H 201 generating a high frequency signal CLK1, for example, of 14 MHz, in accordance with the control of the microcomputer 204; a low frequency clock signal oscillator OSC-L 202 outputting a low frequency clock signal, for example, of 32 kHz, in accordance with the control of the microcomputer 204; a multiplexer 203 receiving the high and low frequency clock signals and selectively outputting the high or low frequency clock signals to the microcomputer 204 and a timer 205 in accordance with the control of the microcomputer 204; the timer 205 generating a predetermined timing signal and receiving the power from the backup unit 200 or the rectifying and smoothing unit 105 and providing the high or low frequency clock signal to the microcomputer 204; and an R/C signal detector 206 receiving the power from the backup unit 200 in the power saving mode or the rectifying and smoothing unit 105 in the normal mode and receiving an externally applied R/C key input signal, thereby outputting the R/C key input signal to the microcomputer 204.

As in the conventional SMPS, the control unit according to the embodiment of the present invention is switched from the normal mode to the power saving mode if the power saving mode key input signal is externally supplied or a predetermined period during which the loads do not consume power has elapsed.

Figure 4A:
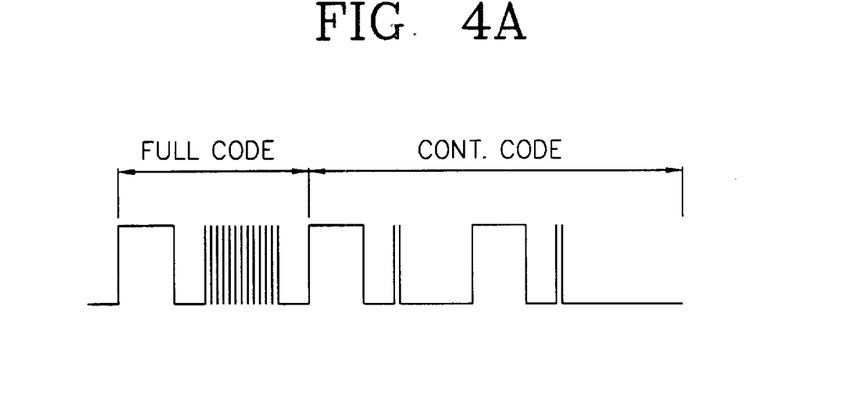
Figure 4B:
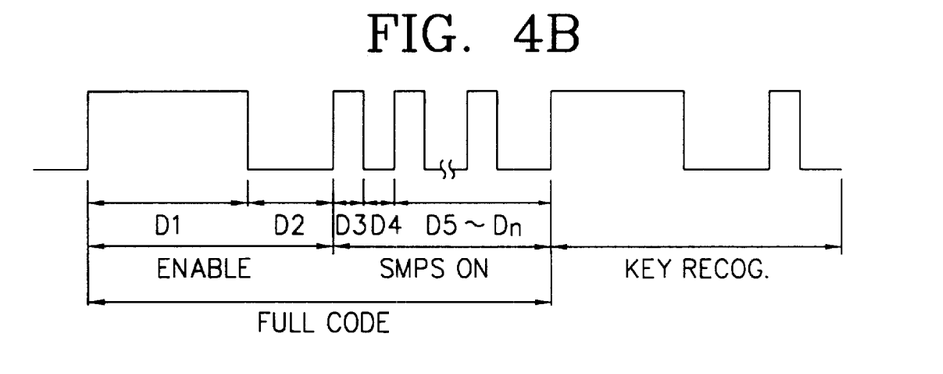

When the power supply is in the power saving mode, the control unit operates in response to a R/C key input signal, as shown in FIGS. 4A–4B and provide power to the loads. Here, the R/C key input signal shown in FIGS. 4A and 4B will be described in detail.

FIG. 4A is a diagram illustrating the R/C key input signal which drives the control unit; namely, the R/C key input signal when the signal is a power supply operation command. As shown, the R/C key input signal includes a full code and a continuous code indicating that the R/C key is continuously pressed. FIG. 4B illustrates the full code of FIG. 4A in more detail. As shown, the full code consists of a low frequency header having a high level pulse width D1 of 9.5 ms and a low level pulse width D2 of 4.5 ms and high frequency data having alternating high and low level pulse widths D3, D4, . . . , Dn each low and high level pulse width being 0.56 ms.

Here, the header is a part enabling the microcomputer 204. When the microcomputer 204 is enabled by detecting the header, the microcomputer 204 analyzes the data next to the header and outputs a control signal corresponding to the data, such as an instruction converting a power saving mode into a normal mode. Also, the continuous code, which is a key input signal indicating that the R/C key is continuously pressed, consists of a low frequency header having predetermined pulse widths (full code D1 and D2).

Now, an operation of the power saving mode controlling apparatus in the power saving mode according to the present invention will be described with the R/C key input signal.

When the power supply is in the normal mode and the loads do not consume power, if the user inputs the power saving key input signal or the predetermined time of no power consumption has elapsed, the microcomputer 204 converts the normal mode of the power supply into the power saving mode so that the power supply does not provide power to the loads.

As described above, when the power supply enters the power saving mode, the backup unit 200, being charged in the normal mode, provides power to the R/C signal receiving unit 206 detecting the externally applied R/C key input signal, the microcomputer 204 receiving a signal from the R/C signal receiving unit 206 and the timer 205 supplying a timing signal to the microcomputer 204.

Here, it is to be noted that the microcomputer 204 operates in a sleeping or SMPS off mode. In the SMPS off mode, the microcomputer 204 causes the multiplexer 203 to output the low frequency signal such that the microcomputer 204 operates at a low speed in accordance with the low frequency clock signal, for example, of 32 kHz (32768 Hz), supplied from the low frequency clock signal oscillator 202.

Consequently, the microcomputer 204 requires considerably lower power than when operating at a high speed.

Figure 5:
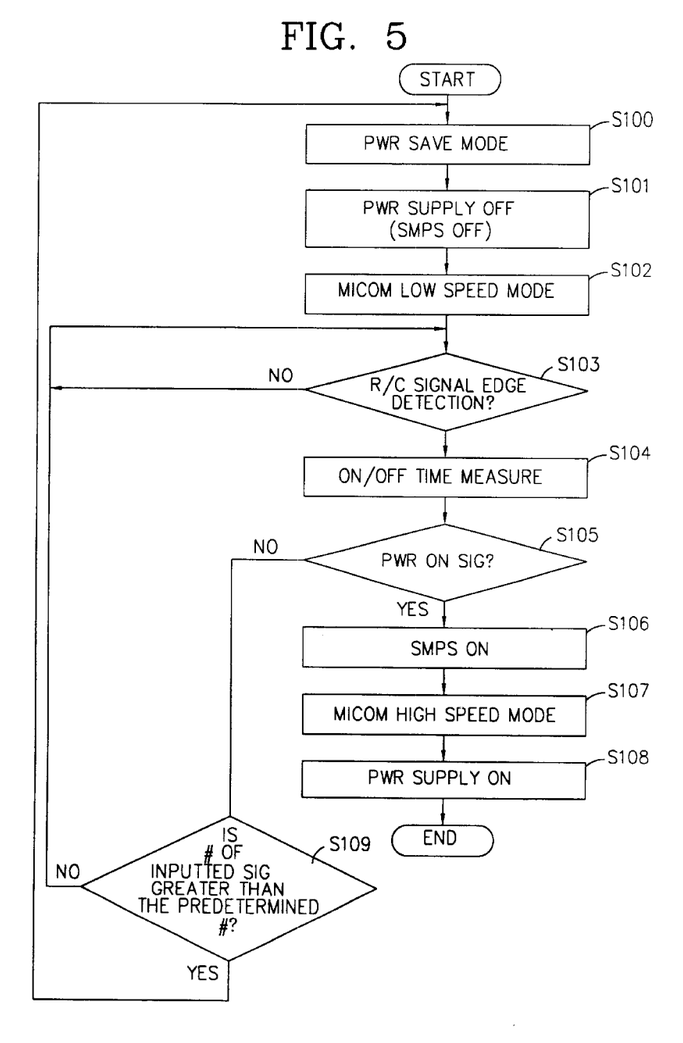
FIG. 5 is a flowchart illustrating a power saving mode controlling method according to a second embodiment of the present invention.

FIG. 5 is a flowchart that illustrates a method of controlling a power saving mode according to a further embodiment of the present invention.

As shown therein, when the power supply is in the power saving mode (S100), a transformer of the power supply is not operated (S101) and thus the microcomputer 204 operates at low speed in the SMPS off mode in accordance with the low frequency clock signal CLK1 of about 32 kHz, which is outputted from the low frequency clock signal oscillator 202 (S102).

Figure 4C:
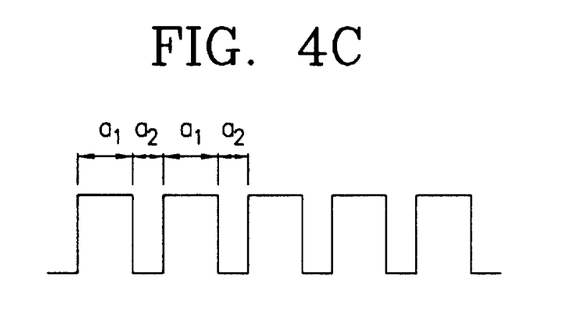

When the R/C key input signal such as shown in FIG. 4C is supplied, the R/C signal receiving unit 206 detects the R/C key input signal and supplies the R/C key input signal to the microcomputer 204. The microcomputer 204 detects edges of the pulses $a_1$ and $a_2$ in the signal of FIG. 4C (S103), measures each of the high and low level pulse widths at the detected edges (S104) and determines therefrom whether the measured pulse widths are the same as the power supply command signal having high and low level pulse widths of 9.5 ms (D1) and 4.5 ms (D2), respectively (S105).

In accordance with the result of the determination step S105, if the R/C key input signal is a power supply operation command signal, the microcomputer 204 enables high speed operation (S106). Namely, the microcomputer 204 enters the SMPS on mode, and causes the multiplexer 203 to output the high frequency clock signal. The microcomputer 204 receives the high frequency clock signal of about 14 MHz from the high frequency oscillator 201 and thus operates at the high speed (S107). Then, the microcomputer 204 detects the data in the high frequency portion of the full code from the R/C key input signal, and switches the power supply circuit from the power saving mode to the normal mode; thereby driving the power supply to provide the power for the loads (S108).

While in accordance with the result of the determination step S105, if the inputted R/C key input signal is not the power supply operation command signal (i.e., another key signal), the microcomputer 204 counts the number of the inputted R/C key input signals for a predetermined period of time, and determines whether the number is greater than a predetermined number (S109). If the counted number of the inputted key input signals is greater than the predetermined number, the microcomputer 204 maintains the power supply in the power saving mode, and operates at a low speed by inputting the low frequency clock of 32 kHz. Otherwise, if the counted number is less than the predetermined number, the microcomputer 204 returns to step S103.

Figure 6A:
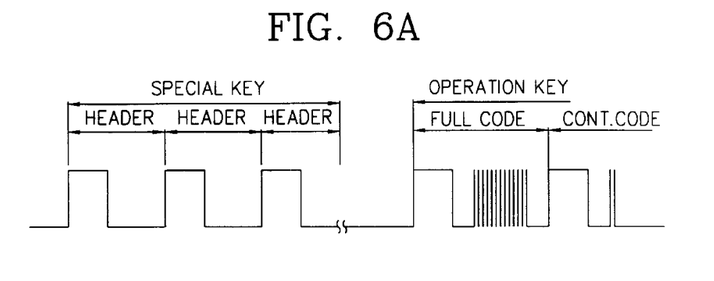
Figure 6B:
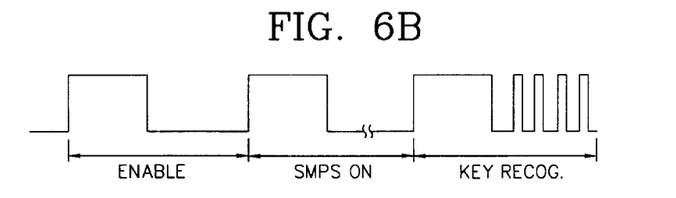
Figure 6C:
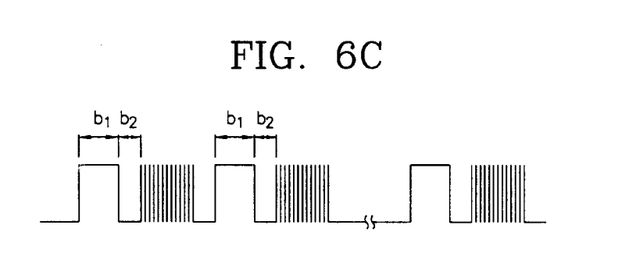

Operation of the control unit according to the embodiment of the present invention in the power saving mode will now be described with the R/C key input signal as shown in FIGS. 6A–6C. FIG. 6A illustrates an R/C key input signal which controls the power saving mode controlling apparatus according to another embodiment of the present invention. The R/C key input signal includes a special key part including three headers and an operation key part including a full code and a continuous code. FIG. 6B detailed illustrates one of the headers and the full code shown in FIG. 6A.

When the power supply is in the power saving mode and the user inputs the R/C key input signal as shown in FIG. 6A, the microcomputer 204 operating in the SMPS off mode detects the special key signal consisting of headers matching the header of a power supply operation command signal so that the power supply is switched to the normal mode from the power saving mode.

Figure 7:
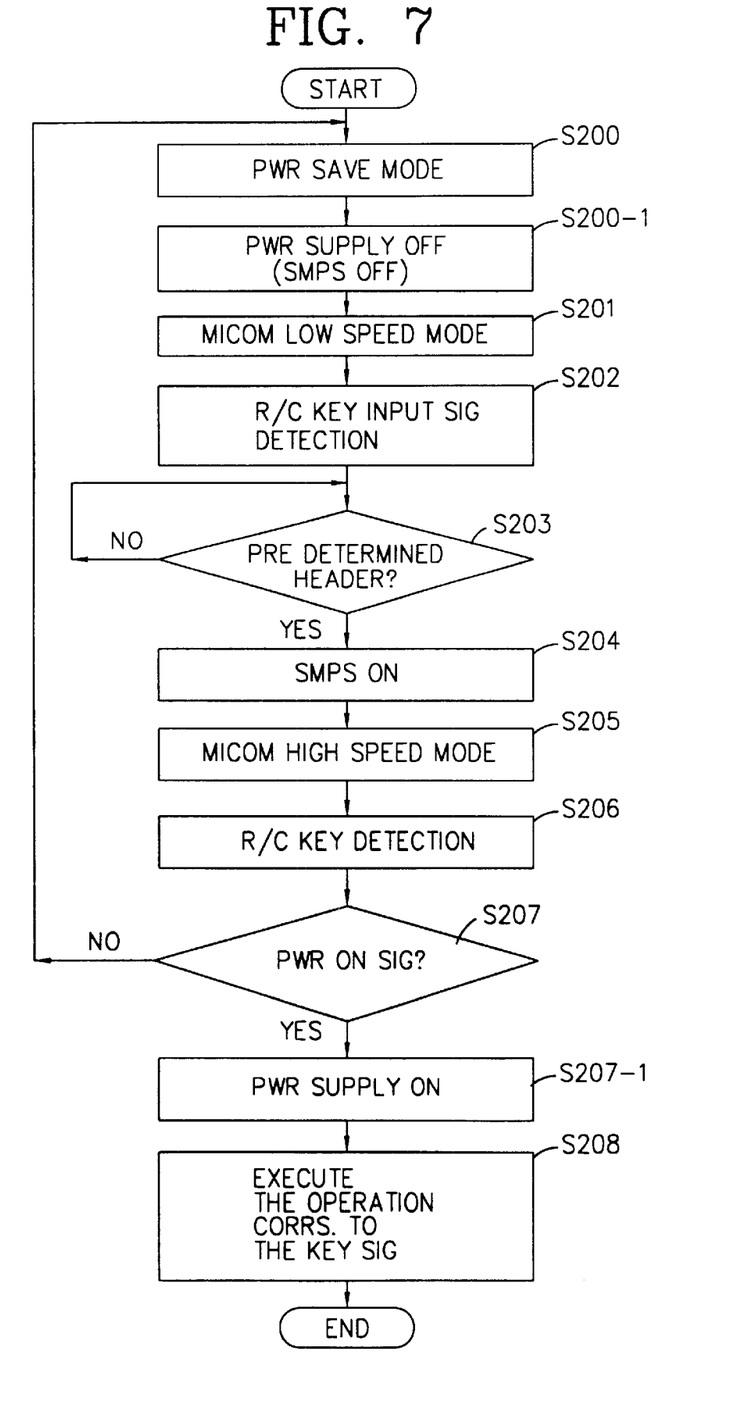
FIG. 7 is a flowchart illustrating a power saving mode controlling method according to a third embodiment of the present invention.

FIG. 7 is a flowchart illustrating a method for controlling a power saving mode according to another embodiment of the present invention.

When the power supply is in the power saving mode (S200), the transformer of the power supply is stopped and the microcomputer 204 enters the SMPS off mode (S200-1) in which the microcomputer 204 operates at the low speed in accordance with the low frequency signal of about 32 kHz (S201).

When the R/C key input signal as shown in FIG. 6C is applied, the R/C signal receiving unit 206 detects and outputs the R/C key input signal to the microcomputer 204. Further, the microcomputer 204 detects the low frequency headers and determines whether the pulses $b_1$ and $b_2$ match the corresponding pulses in the enable portion of the power supply operation command signal (S203).

If a match is determined, the microcomputer 204 switches to the SMPS on mode (S204) and begins operating at the high frequency clock (S205). The microcomputer 204, operating at high speed in accordance with the high frequency clock signal of 14 MHz supplied from the high frequency clock signal oscillator 201, detects the operation key of the continuously applied R/C key input signal (S206).

Namely, in step S206, the microcomputer 204 determines the operation key of the remote controller from the operation key section of the R/C input key signal. If the operation key is determined in step S206 as the power on operation key, the microcomputer 204 switches the power supply circuit to the normal mode from the power saving mode (S207-1), and the microcomputer 204 performs an operation corresponding to further R/C key input signals (S208). If, in step S206, the microcomputer 204 determines that the operation key is not the power on operation key, the microcomputer 204 returns to step S200.

If the microcomputer 204 were driven by the low frequency clock signal of 32 kHz and four cycles are used to carry out an instruction, it would take about 0.308 ms to perform the single instruction. If about ten instructions are processed to detect a single signal, it would take about 3.08 ms to detect the signal and it could become difficult to detect any high frequency data (D3, D4, . . . , Dn of 0.56 ms) included in the R/C key input signal. However, by using the special key part in the R/C key input signal as shown in FIG. 6A, sufficient instructions are provided so that the microcomputer 204 enters the normal mode of operation at the higher frequency, and the data is easily detected.

In a further alternative embodiment, a lower frequency clock produces a signal at a frequency greater than 32 kHz, but less than the high frequency clock signal of 14 MHz. For example, with a low frequency operation clock of 260 kHz, it takes 0.154 ms to receive a single signal instead of 3.08 ms, so that the microcomputer 204 can detect the high frequency data (D3, D4, . . . , Dn) contained in the R/C key input signal. In this alternative embodiment, the low frequency operation clock can be as low as 130 kHz, and is preferably between 130–260 kHz.

Accordingly, when the R/C key input signal is inputted, the data thereof can be detected without entering the SMPS on mode, and a separate special key part in the R/C key input signal is not required. It is further noted that the low frequency clock of 260 kHz has been taken as an example, and if a low frequency clock signal which has higher frequency than 260 kHz, for example, 300 kHz is employed for the present invention, the same effect will be obtained.

As described above, the apparatus and method for controlling the power saving mode according to the present invention drive the microcomputer at a low speed by selecting a low frequency clock signals from among the clock signals outputted from high and low frequency clock oscillators and cancel the power saving mode by detecting headers having a predetermined low frequency in an R/C key input signal. As a result, the power saving mode can be switched to the normal mode of the power supply by the R/C key input signal, and since the microcomputer operates at the relatively low speed in the power saving mode, the power consumed by the microcomputer can be minimized.

In addition, the R/C key input signal in which there is provided the low frequency header followed by high frequency data has been taken as the example in the above embodiments of the present invention. However, if an R/C key input signal in which the order of the header and the data of the R/C key input signal is reversed, the present invention will operate in the same manner.

It will be apparent to those skilled in the art that various modifications and variations can be made in the apparatus and method for controlling the power saving mode of the present invention without departing from the spirit or scope of the invention. Thus, it is intended that the present invention cover the modifications and variations of this invention provided they come within the scope of the appended claims and their equivalents.

What is claimed is:

1. An apparatus for controlling a power saving mode of a switching mode power supply in accordance with receiving a remote control key input signal, comprising:

a low frequency clock generator for generating a low frequency clock signal;

a high frequency clock generator for generating a high frequency clock signal;

a receiver for receiving said remote control key input signal from a remote controller;

a selector for selecting one of the low frequency clock generator and the high frequency clock generator; and a microcomputer for detecting a header of the remote control key input signal received by the receiver and controlling the selector to select output of the high frequency clock generator based on the detected header portion of the remote control key input signal, wherein said microcomputer generates control signals to said switching mode power supply and operates according to a selected one of the low and high frequency clock signals.

2. The apparatus of claim 1, wherein the frequency of the low frequency clock generator is not lower than a frequency of the header of the remote control input signal.

3. The apparatus of claim 1, wherein the switching mode power supply does not supply power to a load while the low frequency clock generator is selected.

4. The apparatus of claim 1, wherein the switching mode power supply supplies power to a load while the high frequency clock signal generator is selected.

5. The apparatus of claim 1, wherein when the microcomputer detects an operation command of the remote control key input signal indicating a power-on request, the microcomputer controls the switching mode power supply to supply power to a load based on the detected operation command of the remote control key input signal.

6. The apparatus of claim 5, wherein the microcomputer selects the low frequency clock signal when the microcomputer does not detect the operation command of the remote control key input signal indicating a power-on request.

7. The apparatus of claim 5, wherein the frequency of the operation command of the remote control key input signal is not higher than the high frequency clock signal from the high frequency clock generator.

8. A method for controlling a power saving mode of a switching mode power supply in response to receiving a remote control key input signal, comprising:

generating a low frequency clock and a high frequency clock;

receiving a remote control key input signal while a microcomputer, which controls operation modes of the switching mode power supply, operates at the low frequency clock;

detecting a header of the received remote control key input signal; and selecting a high frequency clock signal to operate the microcomputer in a normal mode based on the detected header of the received remote control key input signal.

9. The method of claim 8, wherein the frequency of the low frequency clock is not lower than the frequency of the header of the received remote control input signal.

10. The method of claim 8, wherein the switching mode power supply operates in a power saving mode and does not supply power to a load while the microcomputer operates at the low frequency clock.

11. The method of claim 8, wherein the switching mode power supply operates in a normal mode and supplies power to a load while the microcomputer operates at a high frequency clock.

12. The method of claim 8, further comprising:

detecting an operation command of the received remote control key input signal indicating a power-on request while the microcomputer operates at the high frequency clock; and controlling the switching mode power supply to supply power to a load based on the detected operation command of the received remote control key input signal.

13. The method of claim 12, further comprising:

selecting the low frequency clock to operate the microcomputer when no operation command of the received remote control key input signal is detected.

14. The method of claim 12, wherein the frequency of the operation command of the received remote control key input signal is not higher than the high frequency clock.

15. An apparatus for controlling a power saving mode of a switching mode power supply in accordance with receiving a remote control key input signal, comprising:

low frequency clock generator means for generating a low frequency clock signal;

high frequency clock generator means for generating a high frequency clock signal;

receiver means for receiving said remote control key input signal from a remote controller;

selector means for selecting one of the low frequency clock generator means and the high frequency clock generator means; and microcomputer means for detecting a header portion of the remote control key input signal received by the receiver means and controlling the selector means to select output of the high frequency clock generator means based on the detected header portion of the remote control key input signal, wherein the frequency of the low frequency clock generator means is not lower than a frequency of the header portion of the remote control input signal.

\* \* \* \* \*